United States Patent
Hadley

(10) Patent No.: US 6,568,686 B2
(45) Date of Patent: May 27, 2003

(54) MECHANICAL ROTARY SEAL

(75) Inventor: Keith Hadley, Richmond, TX (US)

(73) Assignee: Am-Metric Seal, Inc., Stafford, TX (US)

(*) Notice: Subject to any disclaimer, the term of this patent is extended or adjusted under 35 U.S.C. 154(b) by 16 days.

(21) Appl. No.: 09/729,885

(22) Filed: Dec. 5, 2000

(65) Prior Publication Data

US 2002/0096834 A1 Jul. 25, 2002

(51) Int. Cl.[7] ............................................. F16J 15/34
(52) U.S. Cl. ................................. 277/370; 277/372
(58) Field of Search .............................. 277/370, 372

(56) References Cited

U.S. PATENT DOCUMENTS

| | | | | |
|---|---|---|---|---|
| 2,297,477 A | * | 9/1942 | Huhn et al. ................. 277/370 |
| 2,736,579 A | * | 2/1956 | Dickinson ................... 277/372 |
| 2,835,515 A | * | 5/1958 | Solari ......................... 277/372 |
| 3,042,415 A | * | 7/1962 | Smoll ......................... 277/368 |
| 3,140,129 A | | 7/1964 | Koss ......................... 308/187.2 |
| 3,311,382 A | * | 3/1967 | Dolhun ....................... 277/372 |
| 3,379,443 A | * | 4/1968 | Park et al. .................. 277/369 |
| 3,672,689 A | | 6/1972 | Hadley |
| 3,675,933 A | * | 7/1972 | Nappe ........................ 277/370 |
| 4,121,841 A | * | 10/1978 | Hiraga ........................ 277/372 |
| 4,140,322 A | * | 2/1979 | Nyman ....................... 277/370 |
| 4,213,618 A | | 7/1980 | Thurber |
| 4,289,320 A | | 9/1981 | Altnau |
| 4,448,428 A | * | 5/1984 | Marsi ......................... 277/372 |
| 4,634,134 A | | 1/1987 | Entrikin |
| 5,123,660 A | | 6/1992 | Dahlheimer et al. |
| 5,181,729 A | | 1/1993 | Forssberg ................... 277/367 |
| 5,865,441 A | | 2/1999 | Orlowski .................... 277/364 |
| 5,947,479 A | | 9/1999 | Ostrowski .................. 277/306 |
| 6,017,036 A | | 1/2000 | Murphy ...................... 277/385 |

* cited by examiner

Primary Examiner—Anthony Knight
Assistant Examiner—Michael Wayne White
(74) Attorney, Agent, or Firm—Jo Katherine D'Ambrosio

(57) ABSTRACT

A mechanical rotary seal that produces a positive drive force so that all components of the seal rotate in unison upon a rotating shaft. The mechanical rotating seal effects a tight fluid seal between a submersible pump housing and a rotating shaft when the mechanical rotary seal is engaged with a stationary seal or element within the submersible pump housing. The mechanical rotary seal comprises a seal housing, a retainer having a seal face for engaging with the stationery seal and a coil spring between the seal housing and the retainer. A mechanism for positioning and locking the mechanical rotary seal onto a rotary shaft is positioned within the rear section of the seal housing

14 Claims, 5 Drawing Sheets

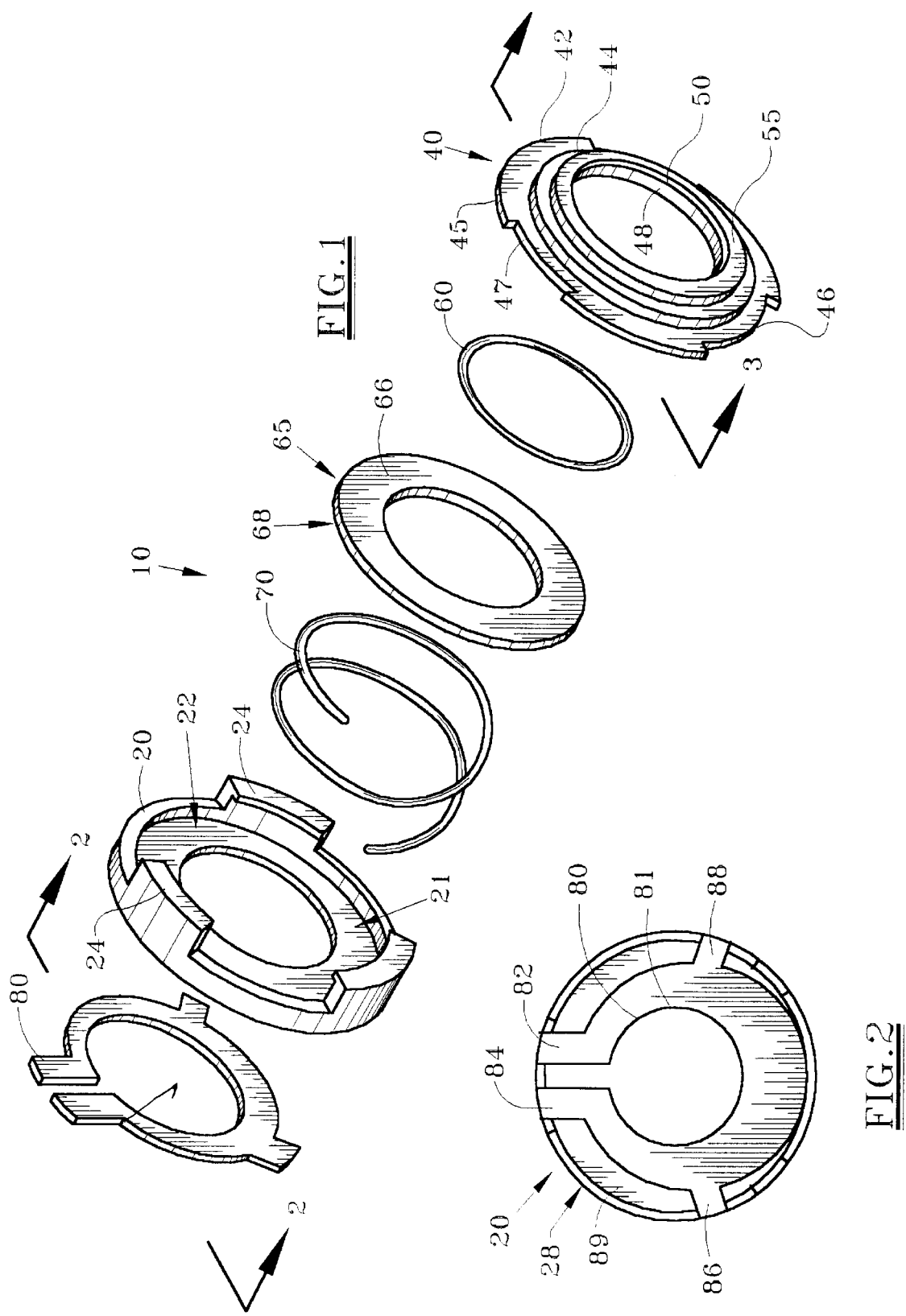

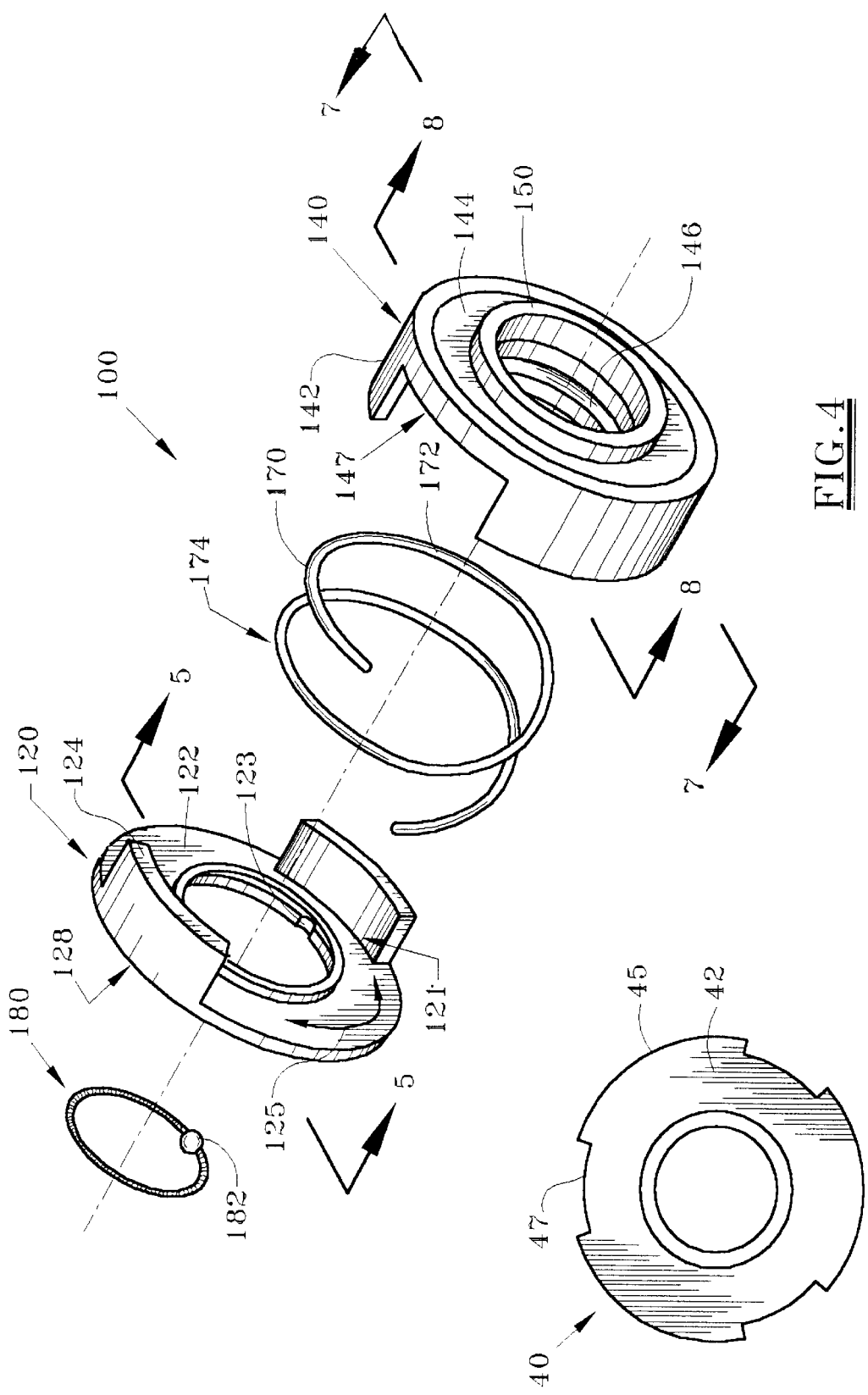

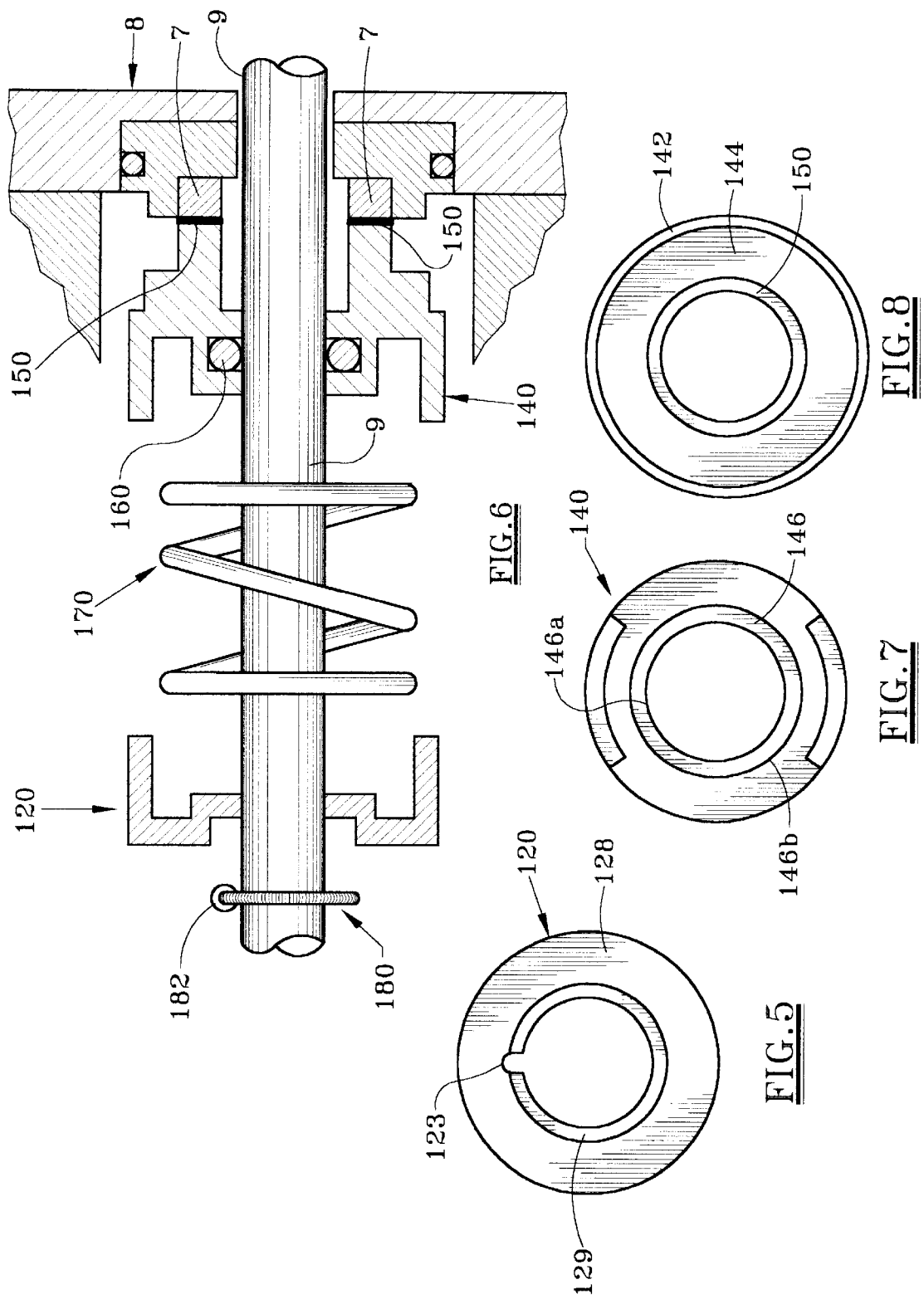

MECHANICAL ROTARY SEAL

FIELD OF THE INVENTION

This invention relates to a mechanical rotary seal used between a submersible pump and a relatively rotating shaft to effect a tight fluid seal between the pump housing and the rotating shaft. More specifically, the invention relates to a mechanical rotating seal comprising a locking mechanism for locking onto the rotary shaft.

BACKGROUND OF THE INVENTION

Mechanical rotating seals are used to effect a tight seal between a rotating shaft and the housing of a submersible pump at the point where the rotating shaft enters the pump housing. Mechanical rotating seals are employed in a variety of submersible pumps used in water treatment facilities and mining operations Rotating seals undergo extraordinary stress created by the friction and rotation of the shaft as it enters the housing. Various materials and structural designs have been utilized to both manage and reduce stress to the seal. These seals wear out quickly and allow foreign matter into the housing thereby requiring frequent service and replacement. Slippage between the parts of the seal occurs during rotation and is also a cause of extensive wear on the seals.

Different forms of shaft sealing mechanisms have been utilized to attempt to keep foreign material from leaking into pump equipment. When foreign materials get into the pump equipment, shaft wear, corrosion, and degradation can occur. Seal mechanisms in current use are often comprised of two seal rings with opposing sealing faces, one face rotating relative to the other, to create a continuous, tight seal. Often coil springs are used to provide continuous contact between the diametrically opposed cooperative seal faces. Different prior art have used different inner structure and arrangements to improve sealing quality and reduce wear. Koss, U.S. Pat. No. 3,140,129, discloses inner and outer rings for receiving a bearing assembly that contains a plurality of roller bearings. The bearing assembly uses race rings to provide a track to maintain the individual bearings in their place. Koss describes a bearing assembly system using tight fitting rings and lubricant to accomplish the seal. Also disclosed is the use of annular sealing rings with a large diameter inserted into retaining grooves on the race rings to create the seal inside the assembly. The bearings are constructed of a low friction material.

A self-contained rotary mechanical seal is disclosed in Thurber, U.S. Pat. No. 4,213,618. The seal includes an annular lug holder that is secured to the rotating shaft by set screws. A belleveville washer assembly is disposed within the lugs. Hadley, in U.S. Pat. No. 3,672,689 teaches a mechanical seal assembly comprising a shaft seal for effecting a seal between a wall member and a rotatable shaft which prevents the flow of pressurized fluid from one to the other side of the wall. A removable slipper sleeve enables the seal assembly to be used in either a balanced or an unbalanced application. Means such as screws engage the parts of the seal to prevent the parts from rotating relative to each other.

Murphy, U.S. Pat. No. 6,017,036, discloses a split seal mechanism using packing material such as cotton fiber or fiberglass to create the seal. The seal must be frequently serviced to replace the material. Entrikin, U.S. Pat. No. 4,634,134, discloses a seal system composed of two fixed rings. The first is fixed with respect to a wall, and the second is fixed with respect to the shaft. The two seal members are oriented with a bushing in between them to stop the entry of material into the area between them and create the resulting seal.

Altnau, U.S. Pat. No. 4,289,320, discloses a conical spring used inside of a rubber bellows, which engages the outside of the base wall, to force the seal ring into engagement with an upper bronze ring. The upper ring is contained inside of a retainer member that is fixed to the outside of a rotating shaft. Orlowski, U.S. Pat. No. 5,865,441, discloses a positive pressure sealing mechanism that can run without grease or lubricant because of fluid pressures asserted against compartments inside of the sealing mechanism. The chamber is fluid tight, but the individual compartments are not. Fluid pressure can move between the different compartments.

Ostrowski, U.S. Pat. No. 5,947,479, discloses a mechanical end face seal using a pair of rotating rings having seal faces in contact with one another. An annular diaphragm is used to apply positive tension between the housing and shaft. The force made by the installed annular diaphragm is made to match the force created by liquid pressures against the seal during operation. Dahlheimer et al., U.S. Pat. No. 5,123,660, discloses a rotary face seal using a contoured diaphragm in an elastomeric boot. A tubular insert of metal is molded into the boot to insure a seal on the shaft. Also, a washer shaped insert is described with raised lands on one of the faces and is embedded in the seal washer to bring all the parts into alignment.

A self-contained rotary mechanical seal is disclosed in Thurber, U.S. Pat. No. 4,213,618. The '618 seal is mounted on a rotating shaft to form a seal between the shaft and the structure on a housing through which the shaft extends. The seal includes an annular lug holder to be secured to the shaft by set screws. A plurality of lugs extend from the lug holder parallel to the shaft. Times extend circumferentially from the ends of the lugs concentric to the axis of the lug holder. Belleville washer assemblies are disposed within the lugs. In U.S. Pat. No. 3,672,689, Hadley discloses a shaft seal for effecting a seal between a wall member and a rotatable shaft A seat is attached to the wall and presents a face to a rotating face of loaded seal assembly so as to present movable seal faces which engage each other as rotation occurs. Fasteners such as screws attach the seal to the rotating shaft.

One problem incurred by mechanical seal devices in the prior references is slippage that occurs between the various component parts as the mechanical seal rotates in conjunction with the rotating shaft. Such slippage increase wear and tear on the seal, increases down time for repair and replacement and decreases sealing capacity.

SUMMARY OF THE INVENTION

One objective of this invention is to provide a seal for rotating equipment that reduces leakage and avoids contamination by reducing slippage of the component parts. Accordingly, a mechanical rotary seal is provided that produces a positive drive force so that all components of the seal rotate in unison with the rotating shaft. The mechanical rotating seal of the present invention effects a tight fluid seal between a submersible pump housing and a rotating shaft entering the submersible pump housing when the mechanical rotary seal is engaged with a stationary seal or element within the submersible pump housing. In one preferred embodiment, the mechanical rotary seal comprises a seal housing, a retainer having a seal face and a coil spring between the seal housing and the retainer. Preferably, the seal housing comprises two or more retaining flanges. The seal housing along with its retaining flanges define a compartment to receive the coiled spring and the retainer. In one preferred embodiment, the retainer comprises a rim defining two or more notches for engaging the rim with the retaining flanges. One side of the retainer comprises a seal face adapted to rotate against the stationary seal face located in the pump housing. A disk is positioned between the retainer and the coil spring mounted within the compartment. One end of the coil spring abuts against the disk so that, when compressed, the spring provides a pressure force against the disk that is translated to the retainer thereby providing a pressure force for maintaining contact between the seal face and the stationery element when the mechanical rotary seal is rotating. In this way, new wear material is continuously present at the interface between the rotating seal face on the retainer and the stationery seal face.

Preferably, a retaining clip abuts the back of the seal housing. The retaining clip can comprise a flexible metal adapted to mount the rotating shaft under tension to maintain the position of the mechanical rotating seal on the rotating shaft and to provide a positive drive force so that the seal housing, the retainer, the disk, the spring and the retaining clip rotate in unison. The seal housing, the retainer, the disk, the coil spring and the retaining clip are configured to be coaxially disposed about the rotating shaft so that, when the mechanical rotary seal is mounted within the pump housing, the seal face is in tight sealing engagement with the stationary element.

In one preferred embodiment, the seal housing encloses the retainer, the disk and the coil spring when the rim is engaged with the retaining flanges prior to engagement with the stationery face. Alternatively, the rim can be spaced away from the retaining flanges when the seal face is in sealing engagement with the stationery face.

In another embodiment of the mechanical rotary seal for effecting a tight fluid seal the rotating shaft defines a shaft socket. The mechanical rotary seal of this embodiment comprises a seal housing, a retainer and a coil spring. The coil spring has a forward end and a rearward end, the rearward end positioned within the seal housing and the forward end positioned within the retainer. The seal housing can comprise a forward section and a rear section, the rear section forming a ridge and the ridge, cooperating with the inner segment, defines a socket. A seal face can be fitted within a forward surface of the retainer.

In this embodiment, a ball in slidable engagement with an annular retaining spring is positioned within the socket of the seal housing when the socket is aligned with the shaft socket on the rotating shaft. Preferably, the annular retaining spring is sized to fit snugly over the rotating shaft. The ball and annular retaining spring are adapted to maintain the position of the mechanical rotating seal when the ball is mounted within the shaft socket of the rotating shaft and provide a positive drive force so that all component parts of the mechanical seal rotate in unison thereby reducing slippage. Preferably, the seal housing, the retainer, the seal face, the coil spring and the annular retaining spring are adapted to be coaxially disposed about the rotating shaft so that the positive drive force is exerted causing the seal housing, the retainer, the seal face, the coil spring and the annular retaining spring to rotate in unison with the rotating shaft when the ball is seated within the shaft socket of the rotating shaft.

BRIEF DESCRIPTION OF THE DRAWINGS

FIG. 1 is an exploded view of one embodiment of the mechanical rotary seal.

FIG. 2 is a cross-sectional view of the seal housing taken along line 2—2 of FIG. 1.

FIG. 3 is a cross-sectional view of the retainer of the present invention taken along line 3—3 of FIG. 1.

FIG. 4 is an exploded view of another embodiment of this invention.

FIG. 5 is a cross-sectional view of the rear section of the seal housing according to the embodiment of FIG. 4 taken along line 5—5.

FIG. 6 illustrated the present invention mounted on a rotary shaft extending into a submersible pump housing.

FIG. 7 is a cross-sectional view of the retainer of the present invention taken along line 7—7 of FIG. 4.

FIG. 8 is a cross-sectional view of the retainer of the present invention taken along line 8—8 of FIG. 4.

DETAILED DESCRIPTION OF THE INVENTION

Figure 9:
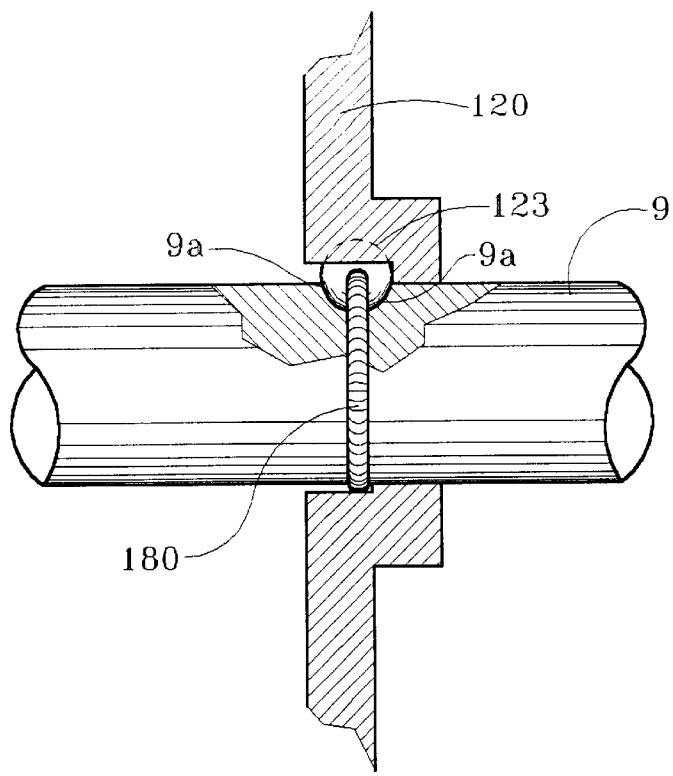
FIG. 9 illustrated the annular retainer spring and ball as positioned on the rotary shaft.

The present invention relates to a seal for rotating equipment that reduces leakage and avoids contamination from entering into the pump equipment by reducing slippage between the component parts when the seal is mounted on a rotary shaft. Accordingly, a mechanical rotary seal is provided that produces a positive drive force so that all components of the seal rotate in unison with the rotating shaft thereby reducing slippage. Referring to the drawings, FIG. 6 illustrates one mechanical rotating seal 10 of the present invention mounted on a rotary shaft 9 and positioned within a submersible pump housing 8. The mechanical rotary seal 10 effects a tight fluid seal between the submersible pump housing 8 and the rotating shaft 9 entering the submersible pump housing 8 when the mechanical rotary seal 10 is engaged with a stationary seal or element 7 within the pump housing 8. FIG. 1 depicts one preferred embodiment in which the component parts of the annular mechanical rotary seal 10 comprise a seal housing 20, a retainer 40 having a seal face 55, a disk 65 and a coil spring 70 between the seal housing 20 and the disk 65. Prior to installation of the mechanical seal 10 into the pump housing 8, the seal housing 20 and the retainer can be interlocked, slightly compressing the coil spring between them. Interlocking the seal housing 20 and retainer 40 facilitates installation by keeping all the component parts assembled. Once in position on the rotating shaft 9, a flexible retaining clip 80 is positioned firmly in the rear section 28 of the seal housing 20. The rear section of the housing forms a retainer clip seat 29 to receive the retaining clip 80. The flexible retaining clip 80 locks on the rotating shaft 9 to lock the mechanical seal 10 in place. Because it is firmly fixed into the rear section 28 of the seal housing 29, the retaining clip 80 produces a positive drive force that causes all the component parts 20, 40, 65,70 to rotate in unison with the rotating shaft 9. In alternative embodiments, shown in FIGS. 4 and 10, an annular retaining spring 180, 280 and ball 182, 282 are used to provide the positive drive force to keep all parts rotating together thereby reducing slippage.

Referring to FIG. 1, the seal housing 20 comprises a forward section 22 and a rear section 28, as shown in FIG. 3, the forward section 22 comprising two or more retaining flanges 24. The forward section 22 of the seal housing 20 and the retaining flanges 24 define a compartment 21 for receiving the coil spring 70. The retainer 40 comprises a circumferential rim 42, a forward surface 44, and a rear surface 46. The circumferential rim 42 comprises an outer edge 45 that defines two or more notches 47. The retaining flanges 24 of the seal housing 20 engage the retainer rim 42 as the rim 42 is snap locked into place within the seal housing 20. The rear surface 46 of the circumferential rim 42 has an inner edge 48 that defines a groove 50. Preferably, an elastomeric o-ring 60 is positioned within the groove 50. The o-ring is configured to be in tight sealing engagement with the rotating shaft 9. In an alternative embodiment, the elastomeric ring is a quad ring, customarily known as a q-ring.

The forward surface 44 of the retainer 40 is fitted with a seal face 55. This seal face 55 rotates against the stationery element 7 within the pump housing 8 to provide a tight fluid seal between the pump housing 8 and the rotating shaft 9. In one preferred embodiment, a disk 65, having a forward face 66 and a rearward face 68, is located between the coil spring 70 and the retainer 40. The forward face is positioned against the rear surface 46 of the retainer 40 so that the disk 65 abuts the retainers rear surface 46 and the o-ring 60. The coil spring 70 is a tapered coil spring. The coil spring 70 has a forward end 72 and a rearward end 74. The tapered coil spring 70 can compress within itself to minimize the amount of space it occupies. When the coil spring 70 is positioned within the compartment 21 the rearward end 74 is seated against the seal housing 20 and the forward end 72 abuts against the disk 65. When the mechanical rotating seal 10 is firmly mounted on the rotary shaft 9 and rotating with the rotary shaft 9, the seal face 55 is pushed against the stationary seal 7 to create a tight seal. The retainer 40 is pushed backwards into the seal housing 20, separating from the retaining flanges and thereby compressing the coil spring 70. The compression of the coil spring 70 creates a pressure force against the disk 65 that is translated to the retainer 40 and the seal face 55 so that continuous contact is maintained between the seal face 55 and the stationary face 7 to compensate for the continuous wear on the sealing faces 7, 55 as one rotates relative to the other.

In the embodiment illustrated in FIGS. 1 and 2, the retaining clip 80 can comprise a flexible material that has a spring-like action, a metal for example. The retaining clip 80 comprises an open ring 81, the ends of the ring 81 forming tines 82, 84. Two or more additional tines 86, 88 extend from the ring 81. The diameter of the retaining clip 80 with its times 82, 84, 86, 88 is slightly greater that the diameter of the retaining clip seat 89 in the rear section 28 of the seal housing 20. An expansion tool (not shown) is slipped over the shaft and is used to separate the tines 82, 84 to mount the retaining clip 80 onto the rotary shaft 9 and then to close the end tines 82, 84 to position the retaining clip 80 within the retaining clip seat 89. At this point the retaining clip 80 is tightly fitted within the rear section 28 of the seal housing 20. It is adapted to tightly clip onto a rotating shaft 9 to maintain the position of the mechanical rotating seal 10 on the rotating shaft 9 and to provide the positive drive force to the mechanical rotating seal 10 so that all the component parts of the mechanical rotary seal 10 rotate in unison. The flow chart below illustrates the transmission of forces between the rotating shaft 9 and the component parts of the mechanical seal.

---

Rotary shaft 9 drives
Retaining Clip 80
drives
retainer 40 within seal housing 20
retainer 40 drives
seal face 55
seal face 55 rotates against stationery seal 7

---

The seal housing 20, the retainer 40, the seal face 55, the o-ring 60, the disk 65, the coil spring 70 and the retaining clip 80 are annular in shape and configured to be coaxially disposed about the rotating shaft 9 so that, when mounted on the rotating shaft 9 within the pump housing, the seal face 55 is in sealing engagement with the stationary element 7.

Preferably, the seal face 55 is manufactured from a tough long lasting material to withstand the wear and tear of rotating against the stationary element. The material can be selected from a group comprising tungsten carbide, silicon carbide and carbon graphite. The retainer 40 and seal housing 20 can be comprised of materials such as hard plastics, stainless steel or brass depending on the type of submersible pump and conditions to which it will be subjected. It is within the scope of this invention that an alternative retainer containing a second seal face may be mounted on the rotary shaft 9 between the disk 65 and the first retainer 40 depending on the conditions surrounding the submersible pump (not shown.)

FIGS. 4, 5, 6, 7 and 8 illustrate another preferred embodiment of the mechanical rotary seal 100. In this embodiment, the mechanical rotary seal 10 comprises a seal housing 120, a retainer 140 and a coil spring 170 compressed between the seal housing 120 and the retainer 140. In this embodiment, the preferred coil spring 170 has a closed and ground end so that the last coil fits flat against the ledge 146 of the retainer 140. The coil spring 170 comprises a forward end 172 and a rearward end 174, the rearward end is positioned within the seal housing 120 and the forward end is positioned within the retainer 140. In this embodiment, the seal housing 120 forms two or more flanges 124 extending perpendicular to the housing 120. The flanges 124 define one or more indents 125 between them. The seal housing 120 with the flanges 124 define a compartment 121 for receiving the coil spring 170. The seal housing has a forward section 122 and a rear section 128, the rear section 128 forming a ridge 129 on its inner circle. As seen in FIGS. 4 and 5, a socket 123 is formed within the ridge 129. The retainer 140 comprises a rim 142, a forward surface 144 (FIG. 8) and a rear surface 147 (FIG. 7), the rear surface 147 forms a ledge 146 having an inner surface 146a and an outer surface 146b. A seal face 150 is fitted within the forward surface 144 of the retainer 140. The rim 142 defines two or more notches 147 for engaging with the flanges 124 of the seal housing 120. The coil spring's 170 forward end is positioned about the outer surface 146b of the ledge 146 so that a pressure force is provided against the seal face 150 when the coil spring 170 is compressed. The seal face 150 adapted to rotate continuously against the stationary element 7 when the pressure force of the coil spring 170 is exerted the outer surface of the ledge 146b and translated to the seal face 150. An o-ring 160 or a quad ring (q-ring, not shown) can be used within the retainer 140 to effect a tight seal when positioned on the rotary shaft 9.

An annular retaining spring 180 is used to position and lock the mechanical rotary seal 100 onto a rotary shaft 9. A ball 182 is in slidable engagement with the annular retaining spring 180 and is positioned within the socket 123 of the seal housing when the annular retaining spring is snugly fitted around the rotating shaft 9. When the socket 123 of the seal housing 120 is in alignment with the shaft socket 9a, the ball 182 is fitted between the two sockets 123, 9a. The ball 182 and annular retaining spring 180 are adapted to maintain the position of the mechanical rotating seal 100 on the rotating shaft 9 thereby providing a positive drive force when the ball is mounted between the socket of the seal housing and a shaft socket 9a within the rotating shaft. When positioned on a rotary shaft 9 as seen in FIG. 6, and rotating against a stationery seal 7, the coil spring is compressed and exerts a pressure force against the ledge 146 of the retainer. The seal housing 120, the retainer 140, the seal face 150, the coil spring 170 and the annular retaining spring 180 are annular in shape and configured to be coaxially disposed about the rotating shaft 9 so that, when mounted within the pump housing 8, the pressure force provided by the coil spring 170 maintains the continuous sealing engagement of the seal face 150 with the stationary element 7. A tight fluid seal is effected between a submersible pump housing 8 and a rotating shaft 9 when the mechanical rotary seal 100 is engaged with a stationary element 7. FIG. 9 illustrates the use of the annular retainer spring 180 and ball 182 to position the mechanical rotary seal 100 about the rotary shaft 9 and provide a positive drive force so that all components of the mechanical seal rotate in unison with the rotary shaft 9. The ball 182 then locks the annular retaining spring 180 in position on the rotary shaft 9 as in tightly fits within the socket 123 of the seal housing 120 and the shaft socket 9a of the rotary shaft 9.

Figure 10:
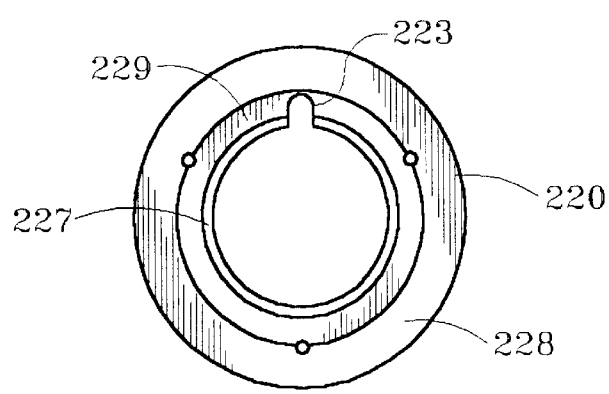
FIG. 10 is a cross-sectional view of the rear section of the seal housing according to the embodiment of FIG. 11 taken along line 10—10.
Figure 12:
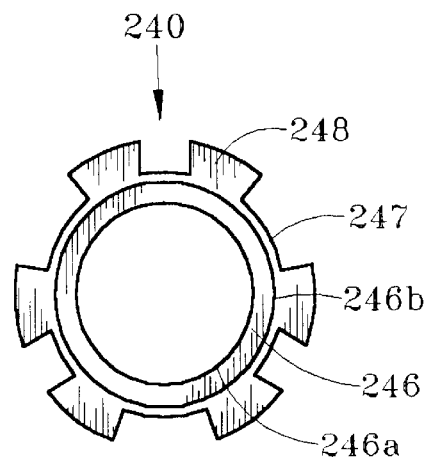
FIG. 12 is a cross-sectional view of the retainer of the present invention taken along line 12—12 of FIG. 11.
Figure 11:
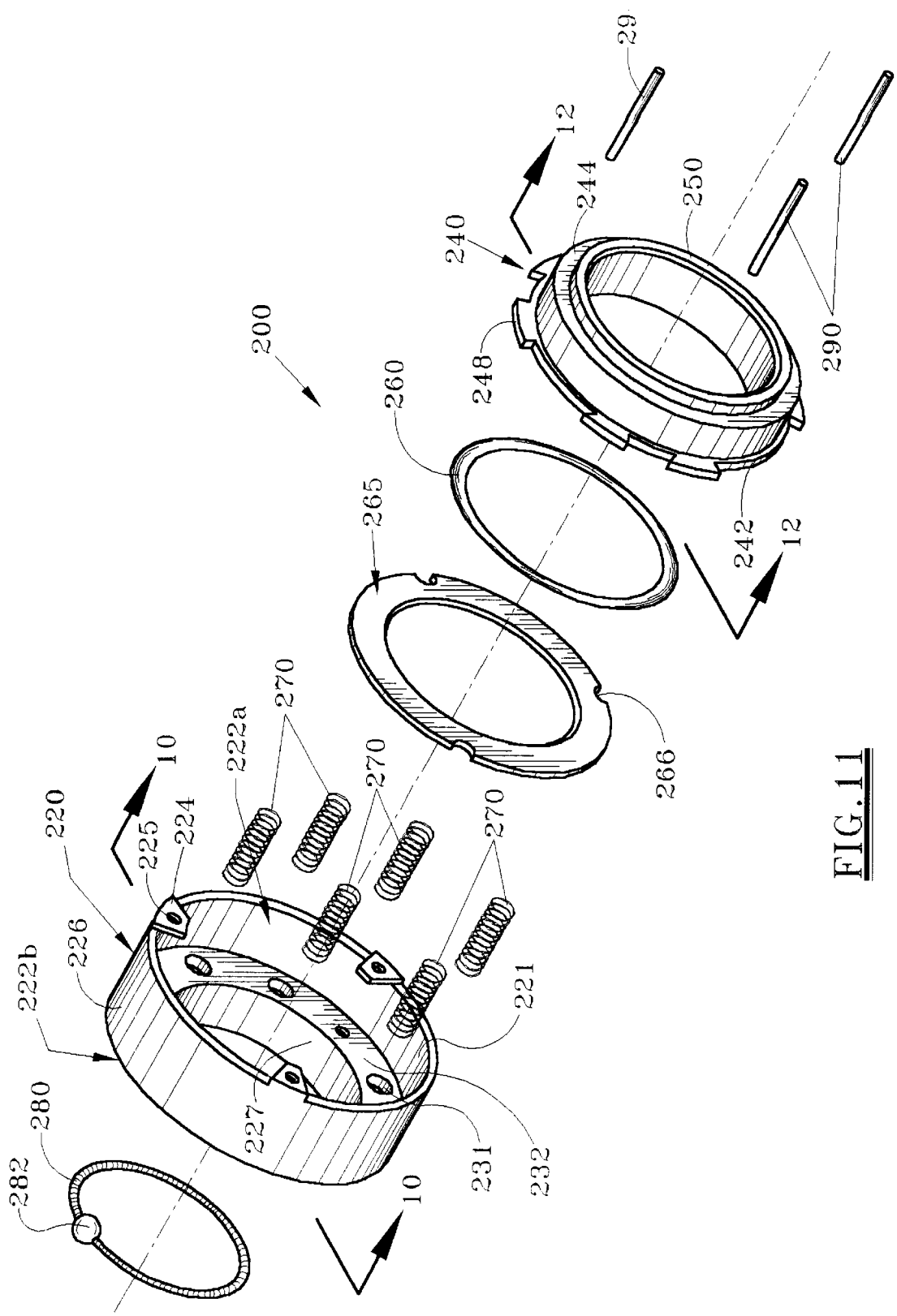
FIG. 11 is an exploded view of a further embodiment of the present invention.

FIGS. 10, 11 and 12 depict another embodiment of the mechanical rotary seal 200 for effecting a tight fluid seal between a submersible pump housing 8 and a rotating shaft 9. In this embodiment, the mechanical rotary seal 200 comprises a seal housing 220, a retainer 240 and two or more springs 270 compressed between the seal housing 220 and retainer 240. The seal housing 220 comprises an inner segment 227 and an outer segment 228 as well as a forward section 222a and a rear section 222b, the forward section 222a comprising an annular collar 226 along the outer segment 228. The annular collar 226 defines a hollow compartment 221 for receiving the coil springs 270. The annular collar 226 comprises an inner sill 231, the inner sill 231 defining two or more spring holes 232 for receiving the springs 270. The collar 226 forms two or more L-shaped flanges 224 directed inwardly. The L-shaped flanges 224 define two or more pin holes 225 longitudinally extending axially through the collar 226 towards the rear section. Two or more pins 229 can be positioned within the pin holes 225 to provide a positive drive force when the retainer 240 is engaged with the seal housing 220 so that all component parts rotate in unison with the seal housing as it rotates with the rotary shaft when the mechanical seal 200 is in operation.

The rear section 222b of the seal housing 220 forms a ridge 229. The ridge 229 and the inner segment 227 define a socket 223. A disk 265 is positioned between the springs 270 and the L-shaped flanges 224. The disk 265 defines notches 266 for alignment with pin holes 225 in the L-shaped flanges 224. The retainer 240 comprises a rim 242, a forward surface 244 and a rear surface 247. The rear surface 247 has a ledge 246 having an inner surface 246a and an outer surface 246b. The inner surface of the ledge 246b defines a groove for receiving an o-ring 260. The rear surface of the rim 247 forms at least two closely spaced rim flanges 248 perpendicular to the rim 240. The rim flanges 248 are positioned beneath the L-shaped flanges 224 of the seal housing 220 when the retainer 240 is twisted into the seal housing 220. A seal face 250 is fitted within the forward surface of the retainer. A pressure force is exerted by the springs 270 maintaining continuous engagement of the seal face 250 against the stationary element 7 when the mechanical rotary seal 200 is rotating against the stationery element 200. An o-ring 260 can be positioned within the groove 268 on the inner surface of the ledge. The o-ring 260 is configured to be in tight sealing engagement with the rotating shaft 9 when mounted on the rotating shaft 9.

A positive drive force is required to keep all components of the mechanical seal 10 rotating in unison. The positive drive force is provided by a ball 282 in slidable engagement with an annular retaining spring. 280. The ball 282 is positioned within the socket 223 of the seal housing 220. The annular retaining spring 280 is sized to fit snugly over the rotating shaft 9 so that the ball 282 fits within the shaft socket 9a. The ball 282 and annular retaining spring 280 are adapted to maintain the position of the mechanical rotating spring 200 when the ball 280 is mounted within the shaft socket 9a of the rotating shaft 9. The seal housing 220, the retainer 240, the seal face 250, the coil spring 270 and the annular retaining spring 280 are adapted to be coaxially disposed about the rotating shaft 9 so that a positive drive force is exerted when the ball is seated within the shaft socket of the rotating shaft causing the seal housing 220, the retainer 240, the seal face 250, the coil springs 270 and the annular retaining spring 280 to rotate in unison with the rotating shaft 9 thereby reducing slippage. Preferably, the rim flanges are separated from the L-shaped flanges when the seal face is rotating against the stationery face. The springs 270 are compressed when the seal face 250 is engaged with the stationery element 7 during rotation with the rotary shaft 9 thereby exerting a pressure force upon the seal face to maintain continuous contact between the seal face 250 and the stationery seal or element 7.

The foregoing description is illustrative and explanatory of preferred embodiments of the invention, and variations in the size, shape, materials and other details will become apparent to those skilled in the art. It is intended that all such variations and modifications which fall within the scope or spirit of the appended claims be embraced thereby.

What is claimed is:

1. A mechanical rotary seal for effecting a tight fluid seal between a submersible pump housing and a rotating shaft when the mechanical rotary seal is engaged with a stationary element within the submersible pump housing, the mechanical rotary seal comprising:

a seal housing comprising a forward section and a rear section, the forward section comprising two or more retaining flanges, the forward section of the seal housing and the retaining flanges defining a compartment;

a retainer comprising a rim, a forward surface, a rear surface, the rear surface having an inner edge, the inner edge defining a groove, a seal face fitted within the forward surface of the retainer, the rim comprising an outer edge, the outer edge defining two or more notches for engaging the rim within the retaining flanges;

the seal face adapted to rotate against the stationary element;

an o-ring positioned within the groove on the rear surface of the retainer, the o-ring configured to be in tight sealing engagement with the rotating shaft;

a disk having a forward face and a rearward face, the forward face positioned against the rear surface of the retainer so that the disk abuts the rear surface and the o-ring;

a coil spring positioned within the compartment, the coil spring have a forward end and a rearward end, the rearward end seated against the seal housing, the forward end abutting against the disk;

a flexible retaining clip tightly fitted within the rear section of the seal housing, the retaining clip adapted to tightly clip onto rotating shaft to maintain the position of the mechanical rotating seal on the rotating shaft and to provide a positive drive force to the mechanical rotating seal;

the seal housing enclosing the retainer, the disk and the coil spring when the seal face is engaged with the stationery element;

the seal housing, the retainer, the seal face, the o-ring, the disk, the coil spring and the retaining clip configured to be coaxially disposed about the rotating shaft so that, when mounted on the rotating shaft within the pump housing, the seal face is in sealing engagement with the stationary element.

2. The mechanical rotary seal of claim 1 wherein the seal housing encloses the retainer, the disk and the coil spring when the rim is engaged with the retaining flanges prior to engagement with the stationery face.

3. The mechanical rotary seal of claim 1 wherein the rim is spaced away from the retaining flanges when the seal face is in sealing engagement with the stationery face.

4. The mechanical rotary seal of claim 1 wherein the seal face is manufactured from a material selected from a group comprising tungsten carbide, silicon carbide and carbon graphite.

5. The mechanical rotary seal of claim 1 wherein the spring is compressed when the retaining flanges are engaged with the rim prior to rotation with the rotary shaft.

6. The mechanical rotary seal of claim 1 wherein the spring is compressed when the seal face is engaged with the stationery element during rotation with the rotary shaft thereby exerting a pressure force upon the seal face to maintain continuous contact between the seal face and the stationery face.

7. A mechanical rotary seal for effecting a tight fluid seal between a submersible pump housing and a rotating shaft when the mechanical rotary seal is engaged with a stationary element within the submersible pump housing, the mechanical rotary seal comprising:

a seal housing comprising two or more retaining flanges, the seal housing with its retaining flanges defining a compartment;

a retainer comprising a rim and a seal face, the rim defining two or more notches for engaging the rim with the retaining flanges;

the seal face adapted to rotate against the stationary element;

a disk positioned against the retainer;

a spring mounted within the compartment, the spring abutting against the disk so that, when compressed, the spring provides a pressure force against the disk that is translated to the retainer thereby providing a pressure force for maintaining contact between the seal face and the stationery element when the mechanical rotating seal is rotating;

a retaining clip abutting the seal housing, the retaining clip comprising a flexible metal adapted to mount the rotating shaft under tension to maintain the position of the mechanical rotating seal on the rotating shaft and to provide a positive drive force so that the seal housing, the retainer, the disk, the spring and the retaining clip rotate in unison;

the seal housing, the retainer, the disk, the spring and the retaining clip configured to be coaxially disposed about the rotating shaft so that, when the mechanical rotary seal is mounted within the pump housing, the seal face is in tight sealing engagement with the stationary element.

8. A mechanical rotary seal for effecting a tight fluid seal between a submersible pump housing and a rotating shaft when the mechanical rotary seal is engaged with a stationary element within the submersible pump housing, the rotating shaft defining a shaft socket, the mechanical rotary seal comprising:

a seal housing, a retainer and a coil spring, the coil spring having a forward end and a rearward end, the rearward end positioned within the seal housing and the forward end positioned within the retainer;

the seal housing comprising a forward section and a rear section, the rear section forming a ridge, the ridge defining a socket;

a seal face fitted within a forward surface of the retainer;

a ball in slidable engagement with an annular retaining spring, the ball positioned within the socket of the seal housing, the annular retaining spring sized to fit snugly over the rotating shaft, the ball and annular retaining spring adapted to maintain the position of the mechanical rotating seal when the ball is mounted within the shaft socket of the rotating shaft;

the seal housing, the retainer, the seal face, the coil spring and the annular retaining spring adapted to be coaxially disposed about the rotating shaft so that a positive drive force is exerted causing the seal housing, the retainer, the seal face, the coil spring and the annular retaining spring to rotate in unison with the rotating shaft when the ball is seated within the shaft socket of the rotating shaft.

9. A mechanical rotary seal for effecting a tight fluid seal between a submersible pump housing and a rotating shaft when the mechanical rotary seal is engaged with a stationary element within the submersible pump housing, the rotating shaft defining a shaft socket, the mechanical rotary seal comprising:

a seal housing, a retainer and a coil spring compressed between the seal housing and the retainer;

the seal housing comprising two or more flanges, the flanges defining one or more indents, the seal housing with the flanges defining a compartment, the seal housing defining a socket;

the retainer comprising a rim, a forward surface, a rear surface, the rear surface comprising a ledge having an inner surface and an outer surface, a seal face fitted within the forward surface of the retainer, the rim defining two or more notches for engaging with the flanges of the seal housing;

the coil spring having a forward end and a rearward end, the rearward end positioned within a spring seat, the forward end positioned about the outer surface of the ledge so that a pressure force is provided against the seal face when the spring is compressed;

the seal face adapted to rotate continuously against the stationary element when the pressure force of the coil spring is exerted on the ledge and translated to the seal face;

a ball in slidable engagement with an annular retaining spring, the ball positioned within the socket of the seal housing, the retaining spring sized to fit snugly over the rotating shaft, the ball and annular retaining spring adapted to maintain the position of the mechanical rotating seal and provide a positive drive force when the ball is mounted between the socket of the seal housing and the shaft socket of the rotating shaft;

the seal housing, the retainer, the seal face, the coil spring and the annular retaining spring configured to be coaxially disposed about the rotating shaft so that, when mounted within the pump housing, the pressure force provided by the coil spring maintains the continuous sealing engagement of the seal face with the stationary element.

10. The mechanical rotary seal of claim 8 wherein the retainer defines a groove, the mechanical rotary seal further comprising an o-ring positioned within the groove, the o-ring configured to be in tight sealing engagement with the rotating shaft.

11. A mechanical rotary seal for effecting a tight fluid seal between a submersible pump housing and a rotating shaft when the mechanical rotary seal is engaged with a stationary element within the submersible pump housing, the rotating shaft defining a shaft socket, the mechanical rotary seal comprising:

a seal housing, a retainer and two or more springs compressed between the seal housing and retainer;

the seal housing comprising an inner segment and an outer segment, the seal housing further comprising a forward section and a rear section, the forward section comprising an annular collar along the outer segment;

the annular collar defining a hollow compartment for the springs, the annular collar comprising an inner sill, the inner sill defining two or more spring holes for receiving the springs, the collar forming two or more L-shaped flanges, the L-shaped flanges defining two or more pin holes longitudinally extending axially through the collar towards the rear section;

two or more pins positioned within the pin holes to provide a positive drive force when the retainer is engaged with the seal housing so that the retainer rotates in unison with the seal housing;

the rear section forming a ridge, the ridge and the inner segment defining a socket;

a disk positioned between the springs and the L-shaped flanges, the disk defining notches for alignment with pin holes in the L-shaped flanges;

the retainer comprising a rim, a forward surface, a rear surface, the rear surface comprising a ledge having an inner surface and an outer surface, the inner surface of the ledge defining a groove, the rear surface of the rim forming at least two closely spaced rim flanges, the rim flanges positioned beneath the L-shaped flanges when the retainer is twisted into the seal housing;

a seal face fitted within the forward surface of the retainer, the pressure force provided by the springs maintaining continuous engagement of the seal face against the stationary element when the mechanical rotary seal is rotating against the stationary element;

an o-ring positioned within the groove on the inner surface of the ledge, the o-ring configured to be in tight sealing engagement with the rotating shaft when mounted on the rotating shaft;

a ball in slidable engagement with an annular retaining spring, the ball positioned within the socket of the seal housing, the annular retaining spring sized to fit snugly over the rotating shaft, the ball and annular retaining spring adapted to maintain the position of the mechanical rotating seal when the ball is mounted within the shaft socket of the rotating shaft;

the seal housing, the retainer, the seal face, the coil spring and the annular retaining spring adapted to be coaxially disposed about the rotating shaft so that a positive drive force is exerted when the ball is seated within the shaft socket of the rotating shaft causing the seal housing, the retainer, the seal face, the coil spring and the annular retaining spring to rotate in unison with the rotating shaft.

12. A mechanical rotary seal for effecting a tight fluid seal between a submersible pump housing and a rotating shaft when the mechanical rotary seal is engaged with a stationary element within the submersible pump housing, the rotating shaft defining a shaft socket, the mechanical rotary seal comprising:

a seal housing, a retainer and two or more springs compressed between the seal housing and the retainer;

the seal housing comprising an annular collar, the annular collar defining a socket;

the annular collar defining a hollow seat for the springs, the annular collar forming two or more L-shaped flanges, the L-shaped flanges defining two or more pin holes longitudinally extending axially through the collar;

two or more pins positioned within the pin holes;

a disk positioned between the springs and the L-shaped flanges;

the retainer forming at least two closely spaced rim flanges, the rim flanges defining spaces between each other, the rim flanges wedged beneath the L-shaped flanges so that L-shaped flanges are located above the spaces when the retainer is in twist lock engagement with the seal housing;

a seal face fitted within the retainer, the seal face adapted to rotate against the stationary element; and a ball in slidable engagement with an annular retaining spring, the ball positioned within the socket of the seal housing, the annular retaining spring sized to fit snugly over the rotating shaft so that the ball is mounted within the shaft socket of the rotating shaft.

13. The mechanical rotary seal of claim 12 wherein the rim flanges are separated from the L-shaped flanges when the seal face is rotating against the stationery face.

14. The mechanical rotary seal of claim 12 wherein the springs are compressed when the seal face is engaged with the stationery element during rotation with the rotary shaft thereby exerting a pressure force upon the seal face to maintain continuous contact between the seal face and the stationery element.

* * * * *